US010038241B2

(12) United States Patent
Hijioka et al.

(10) Patent No.: US 10,038,241 B2
(45) Date of Patent: Jul. 31, 2018

(54) SEMICONDUCTOR DEVICE AND TRANSMISSION-RECEPTION SYSTEM

(71) Applicant: RENESAS ELECTRONICS CORPORATION, Tokyo (JP)

(72) Inventors: Kenichiro Hijioka, Tokyo (JP); Masaaki Soda, Tokyo (JP); Masaharu Matsudaira, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 199 days.

(21) Appl. No.: 14/946,509

(22) Filed: Nov. 19, 2015

(65) Prior Publication Data
US 2016/0149304 A1   May 26, 2016

(30) Foreign Application Priority Data
Nov. 20, 2014  (JP) ................... 2014-235287

(51) Int. Cl.
*H01Q 7/00*  (2006.01)
*H04B 5/00*  (2006.01)
(Continued)

(52) U.S. Cl.
CPC ............. *H01Q 7/00* (2013.01); *H04B 5/0075* (2013.01); *B41J 19/00* (2013.01); *H01Q 1/38* (2013.01)

(58) Field of Classification Search
CPC ...... H01Q 7/00; H01Q 1/2208; H01Q 1/2216; H01Q 1/2225; H01Q 1/2283; H01Q 9/26; H01Q 9/265
See application file for complete search history.

(56) References Cited

U.S. PATENT DOCUMENTS 6,208,161 B1   3/2001  Suda
7,378,972 B2 *  5/2008  Kai ................. G06K 19/045
                                                340/572.1
(Continued)

FOREIGN PATENT DOCUMENTS

JP   11-205118 A   7/1999
JP    3166571 B2   5/2001
(Continued)

OTHER PUBLICATIONS

T. Takeya et al., "A 12Gb/s Non-Contact Interface with Coupled Transmission Lines", IEEE International Solid-State Circuits Conference, Digest of Technical Papers, 2011, pp. 492-494.

*Primary Examiner* — Tho G Phan
*Assistant Examiner* — Patrick Holecek
(74) *Attorney, Agent, or Firm* — McDermott Will & Emery LLP

(57) ABSTRACT

An object of the invention is to transmit a waveform suitable for the reception of signals, while suppressing an increase in man-hours needed for design. A transmission-reception device (2) includes: an antenna element (21) which is terminated at a virtual ground point side of the antenna element by a terminating element (213); a conductor plane (23) which has a predetermined potential and surrounds the antenna element (21); and a transmission circuit (25) that outputs a differential signal to both ends of the antenna element (21). An interval between the conductor plane (23) and a first outer edge (214) of the antenna element (21) is shorter than an interval between the conductor plane (23) and a second outer edge (215) of the antenna element (21).

8 Claims, 21 Drawing Sheets

(51) Int. Cl.
*B41J 19/00* (2006.01)
*H01Q 1/38* (2006.01)

(56) References Cited

U.S. PATENT DOCUMENTS

| | | | |
|---|---|---|---|
| 9,203,477 B2* | 12/2015 | Nakayama | H01Q 21/28 |
| 9,270,010 B2* | 2/2016 | Blumberg, Jr. | A47J 31/40 |
| 2013/0203361 A1 | 8/2013 | Hijioka et al. | |

FOREIGN PATENT DOCUMENTS

| | | |
|---|---|---|
| JP | 2003-018224 A | 1/2003 |
| JP | 2006-115337 A | 4/2006 |
| JP | 2013-161905 A | 8/2013 |

\* cited by examiner

SEMICONDUCTOR DEVICE AND TRANSMISSION-RECEPTION SYSTEM

CROSS-REFERENCE TO RELATED APPLICATIONS

This application is based upon and claims the benefit of priority from Japanese patent application No. 2014-235287, filed on Nov. 20, 2014, the disclosure of which is incorporated herein in its entirety by reference.

BACKGROUND

The present invention relates to a semiconductor device and a transmission-reception system, and more particularly, to a semiconductor device and a transmission-reception system which transmit signals by, for example, electromagnetic field coupling between antennas located in proximity to each other.

A technique called a "non-contact connector" to perform non-contact baseband transmission between semiconductor chips, which are respectively connected to antennas, by electromagnetic field coupling between the antennas is known. This technique has an advantage in that it can be performed at a high speed due to the baseband transmission without using radio modulation between antennas located in proximity to each other, though the transmission distance is limited. Further, since there is no need to provide a modulation circuit, the technique is effective for reducing power consumption. A configuration in which a loop antenna is used as an antenna in a non-contact connector is known (Japanese Unexamined Patent Application Publication No. 2013-161905). A technique in which baseband transmission is performed through an electromagnetic field between transmission lines terminated by a resistive element is disclosed in "A 12 Gb/s Non-Contact Interface with Coupled Transmission Lines", T. Takeya et al., IEEE International Solid-State Circuits Conference, Digest of Technical Papers, 2011, pp. 492-494. As a technique for reducing common-mode noise, the technique of terminating a transmission line using a resistive element and a capacitive element is known (Japanese Unexamined Patent Application Publication No. 2006-115337, Japanese Patent No. 3166571, Japanese Unexamined Patent Application Publication No. 2003-18224, and Japanese Unexamined Patent Application Publication No. H11-205118).

SUMMARY

The present inventors have found the following problem.
In order to transmit a waveform suitable for the reception of signals, it is necessary to design antennas in consideration of a frequency response that varies in a complicated manner due to an electromagnetic field generated between antennas. This results in an increase in man-hours needed for design.

Other problems to be solved by and novel features of the present invention will be apparent from the following description and the accompanying drawings.

A first aspect of the present invention is a semiconductor device including: an antenna element which is terminated at a virtual ground point side of the antenna element; and a conductor which surrounds the antenna element. An interval between the conductor and a first outer edge of the antenna element is shorter than an interval between the conductor and a second outer edge of the antenna element.

According to the first aspect of the present invention, it is possible to transmit a waveform suitable for the reception of signals, while suppressing an increase in man-hours needed for design.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
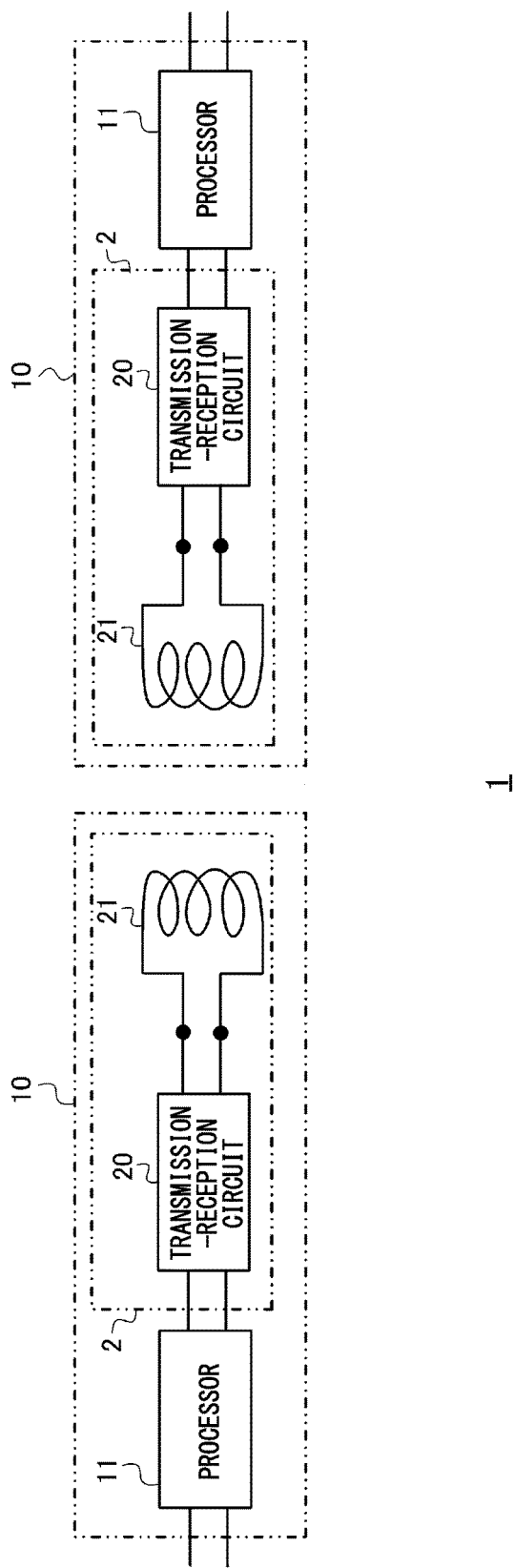
FIG. 1 is a block diagram showing a configuration of a transmission-reception system according to a first embodiment.

Specific embodiments will be described in detail below with reference to the drawings. Identical or corresponding elements are denoted by the same reference numerals throughout the drawings, and repeated explanations are omitted as needed to clarify the explanation.

First Embodiment

FIG. 1 is a block diagram showing a configuration of a transmission-reception system 1 according to a first embodiment. The transmission-reception system 1 includes two information processing devices 10. The information processing devices 10 each include a transmission-reception device 2 and a processor 11. In the first embodiment, the transmission-reception system 1 includes a pair of transmission-reception devices 2, which function as a transmission device and a reception device, and has a configuration capable of bidirectional transmission and reception of data. The transmission-reception system 1 may have a configuration in which one of the information processing devices 10 includes a transmission device but does not include a reception device, while the other information processing device 10 includes a reception device but does not include a transmission device. The transmission-reception devices described in the first and subsequent embodiments are examples of a semiconductor device.

When the information processing device 10 functions as a transmission-side information processing device, the processor 11 outputs a baseband signal to the transmission-reception device 2. For example, NRZ (Non Return to Zero) coding is used as a transmission coding system applied to the baseband signal, but instead transmission coding systems other than NRZ coding may be used. The transmission-reception device 2 includes a transmission-reception circuit 20 and an antenna element 21. When the information processing device 10 functions as a transmission-side information processing device, the transmission-reception device 2 amplifies the baseband signal output from the processor 11, and the antenna element 21 transmits the amplified baseband signal to the reception-side information processing device 10. When the information processing device 10 functions as a reception-side information processing device, the antenna element 21 in the transmission-reception device 2 receives a signal transmitted from the transmission-side information processing device 10, and outputs the received signal to the processor 11. When the information processing device 10 functions as a reception-side information processing device, the processor 11 executes predetermined processing on the received baseband signal.

For example, when the information processing device 10 functions as a transmission-side information processing device, the processor 11 may perform processing, such as a processing treatment or digital modulation processing, on data from an input device (not shown), such as a camera, and may output the data as a baseband signal to the transmission-reception device 2. When the information processing device 10 functions as a reception-side information processing device, the processor 11 may output the received data to an output device (not shown) such as a display.

Figure 2:
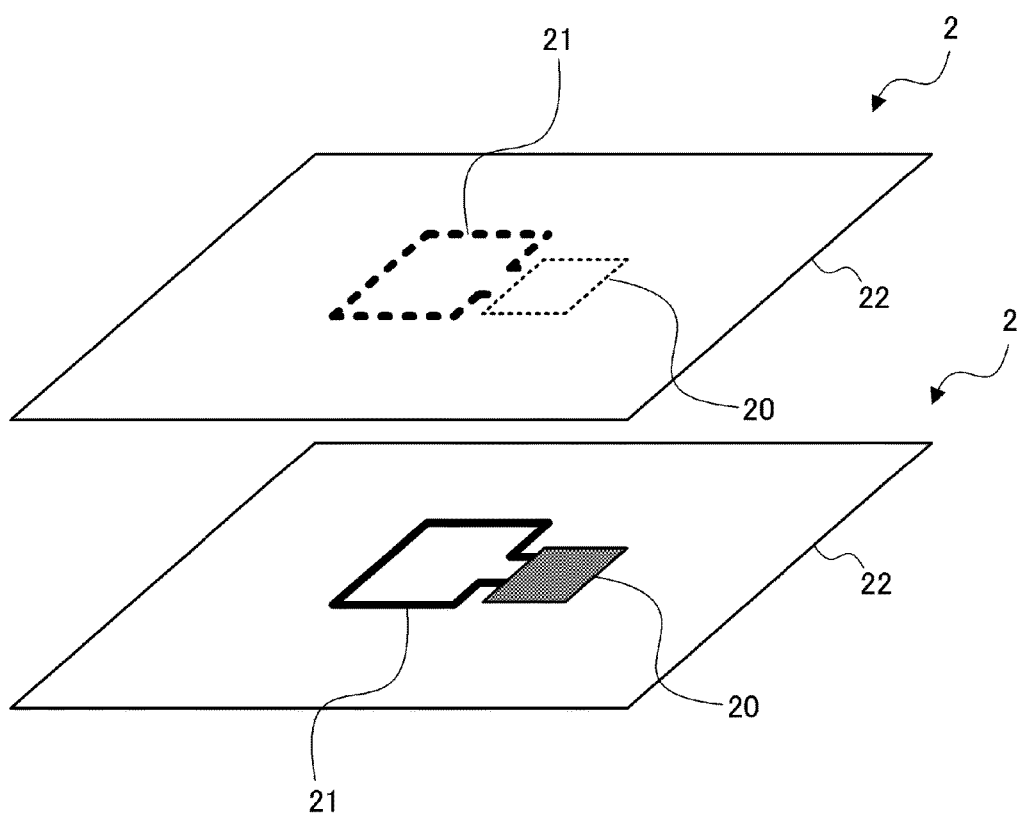
FIG. 2 is a perspective view schematically showing the arrangement of a pair of transmission-reception devices included in the transmission-reception system according to the first embodiment.

FIG. 2 is a perspective view schematically showing the arrangement of the pair of transmission-reception devices 2 included in the transmission-reception system 1 according to the first embodiment. In each of the transmission-reception devices 2 shown in FIG. 2, the illustration of a conductor plane 23 which surrounds the antenna element 21 as described later is omitted.

In the transmission-reception system 1, as shown in FIG. 2, the pair of transmission-reception devices 2 are located in proximity to each other so that they are opposed to each other. The transmission-reception system 1 transmits signals using electromagnetic field coupling between the antenna element 21 of one of the transmission-reception devices 2 and the antenna element 21 of the other transmission-reception device 2. More specifically, in the first embodiment, substrates 22 of the respective transmission-reception devices 2 are opposed substantially parallel to each other. On each of the substrates 22, the antenna element 21 and the transmission-reception circuit 20 are provided. In this manner, one of the antenna elements 21 and the other one of the antenna elements 21 are disposed at a predetermined interval so as to overlap each other.

Figure 3:
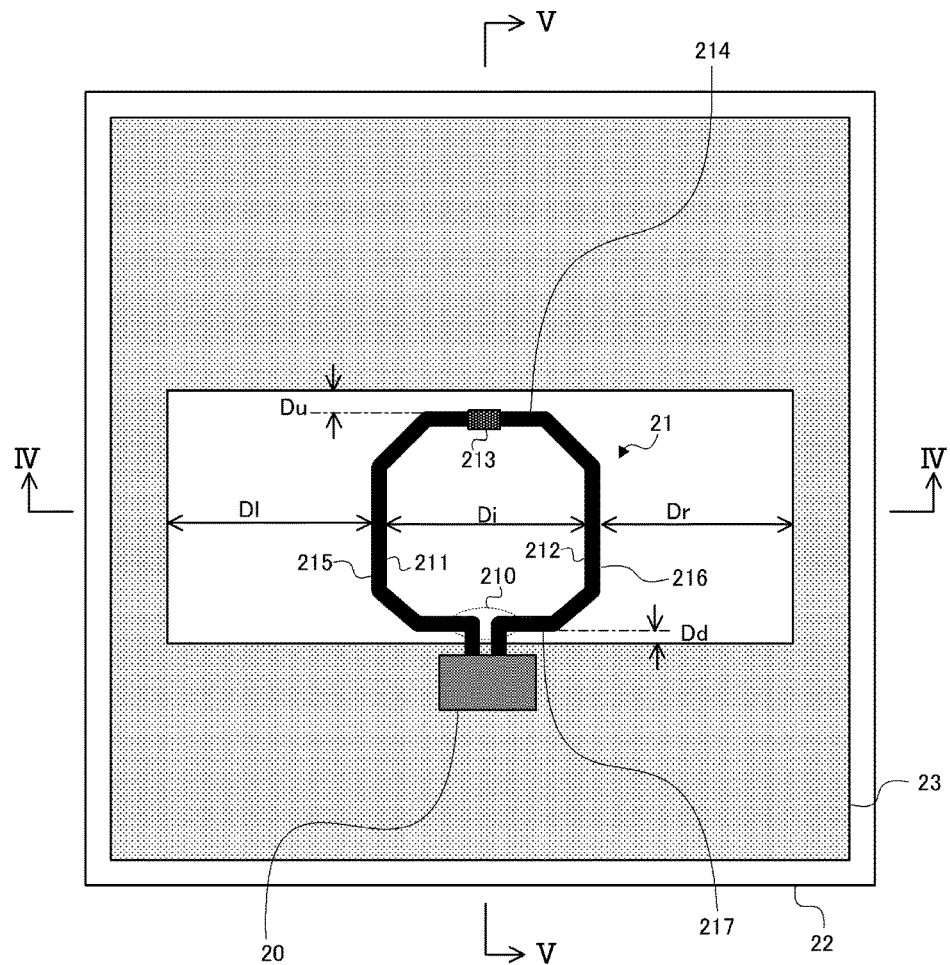
FIG. 3 is a plan view schematically showing the transmission-reception system according to the first embodiment.
Figure 4:
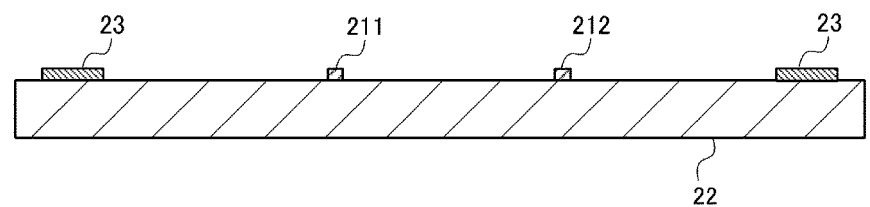
FIG. 4 is a sectional view taken along a line IV-IV of FIG. 3.
Figure 5:
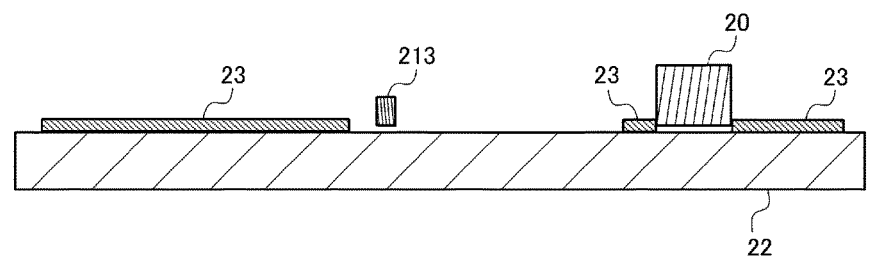
FIG. 5 is a sectional view taken along a line V-V of FIG. 3.

Next, the transmission-reception device 2 will be described. FIG. 3 is a plan view schematically showing the transmission-reception device 2. FIG. 4 is a sectional view taken along a line IV-IV of FIG. 3. FIG. 5 is a sectional view taken along a line V-V of FIG. 3.

As shown in FIGS. 3 to 5, the transmission-reception device 2 includes the transmission-reception circuit 20, the antenna element 21, the substrate 22, and the conductor plane 23.

The antenna element 21 is an antenna composed of a conductor which has a ring shape and partially includes a discontinuous portion 210. The antenna element 21 is formed on the substrate 22 which is a printed board such as FR4 (Flame Retardant Type 4). For example, as shown in FIG. 3, the antenna element 21 is formed symmetrically with respect to a line. In the antenna element 21, both ends of the conductor forming the discontinuous portion 210 are bent toward the outside of the ring shape. Both of the ends of the conductor are connected to the transmission-reception circuit 20 provided on the substrate 22. The transmission-reception circuit 20 outputs a differential signal to the antenna element 21.

In this case, the antenna element 21 is terminated at a virtual ground point side of the antenna element 21 by a terminating element 213. More specifically, the conductor forming the antenna element 21 includes a first antenna portion 211 and a second antenna portion 212 which are connected in the following manner.

One end of the first antenna portion 211 is electrically connected to the transmission-reception circuit 20, and the other end of the first antenna portion 211 is electrically connected to the terminating element 213. One end of the second antenna portion 212 is electrically connected to the transmission-reception circuit 20, and the other end of the second antenna portion 212 is electrically connected to the terminating element 213. That is, the antenna element 21 has a configuration in which the first antenna portion 211, the terminating element 213, and the second antenna portion 212 are continuously formed in a ring shape. With this configuration, the antenna element 21 is terminated at a node corresponding to a virtual ground point when the antenna element 21 is set as a differential line. In the first embodiment, the terminating element 213 is a resistive element.

The antenna element 21 having the configuration as described above is produced in such a manner that, for example, a copper wire that constitutes the first antenna portion 211 and the second antenna portion 212 is formed on the substrate 22 and then the terminating element 213 is mounted on the substrate 22.

When the transmission-reception circuit 20 functions as a transmission-side circuit, the transmission-reception circuit 20 transmits a differential signal to the antenna element 21. When the transmission-reception circuit 20 functions as a reception-side circuit, the transmission-reception circuit 20 acquires the differential signal received by the antenna element 21.

Figure 6:
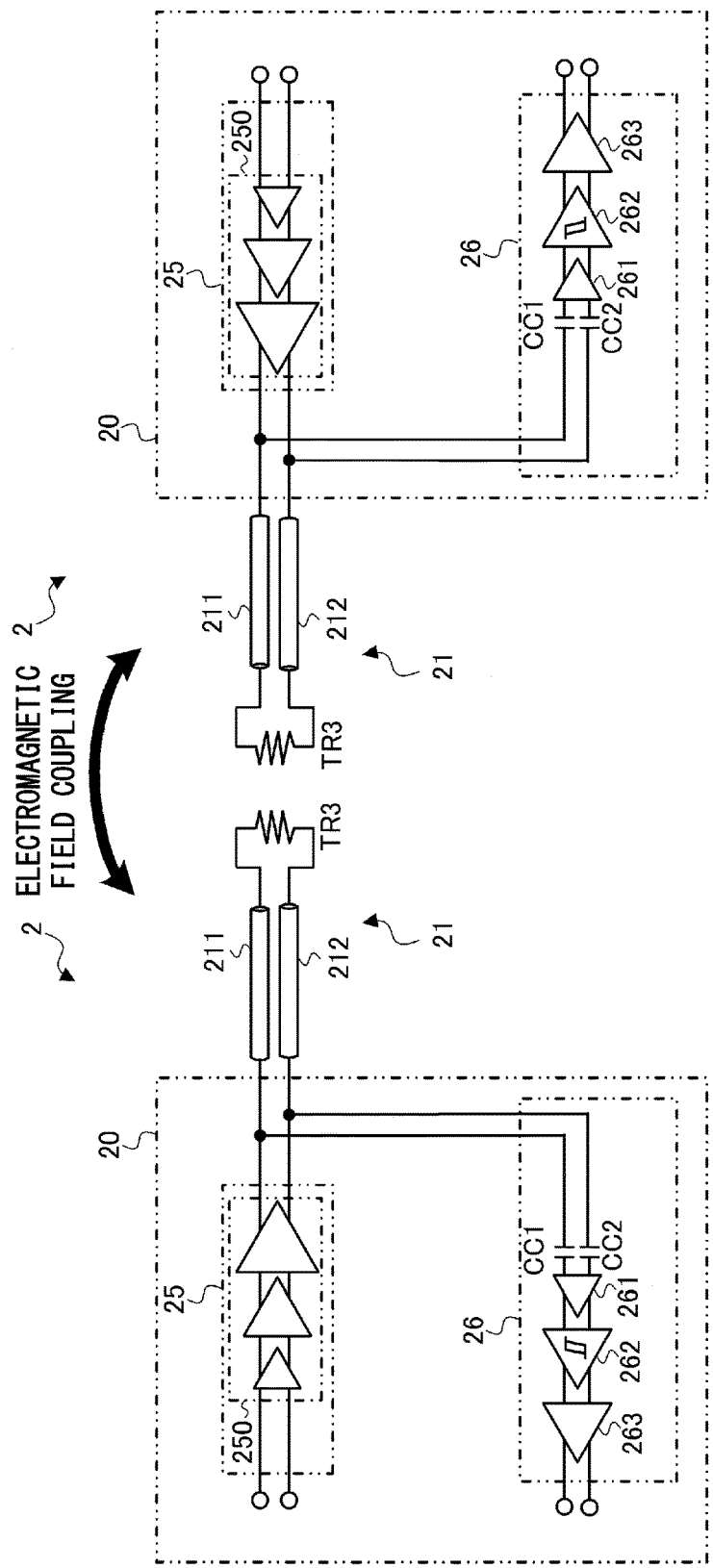
FIG. 6 is a circuit diagram showing a circuit configuration example of the transmission-reception system according to the first embodiment.

FIG. 6 is a circuit diagram showing a circuit configuration example of the two transmission-reception devices 2. As shown in FIG. 6, each transmission-reception circuit 20 includes a transmission circuit 25 and a reception circuit 26. In the transmission-reception device 2, both ends of the antenna element 21 are respectively connected to a pair of differential signal output terminals of the transmission circuit 25 and a pair of differential signal input terminals of the reception circuit 26.

In the transmission circuit 25, baseband signals (for example, NRZ signals), which are input transmission signals, are amplified by a driver group 250, and the baseband signals are output to both of the ends of the antenna element 21 as differential signals. Thus, voltage signals according to the transmission signals input to the transmission circuit 25 are excited at both of the ends of the antenna element 21. As a result, according to a voltage excited at one of the antenna elements 21, a received pulse is excited at the other one of the antenna elements 21 that is electromagnetically coupled to the one of the antenna elements 21. Although not shown, the transmission circuit 25 may include a waveform equalizing circuit which is generally referred to as an "equalizer circuit".

The reception circuit 26 is a circuit that receives differential signals from both of the ends of the antenna element 21 and includes, for example, AC (alternating current) coupling capacitors CC1 and CC2, drivers 261 and 263, and a hysteresis amplifier 262. The ends of the antenna element 21 are connected to the driver 261 through the AC coupling capacitors CC1 and CC2, respectively. The driver 261 amplifies the received signals and outputs the amplified signals to the hysteresis amplifier 262. The hysteresis amplifier 262 converts the pulse signals received from the antenna element 21 into signals of a predetermined line coding system (for example, NRZ coding). The driver 263 amplifies and outputs the signals received from the hysteresis amplifier 262. As described above, the antenna element 21 includes the first antenna portion 211, the second antenna portion 212, and a resistor TR3 serving as the terminating element 213. With this configuration, the antenna element 21, together with the transmission circuit 25 and the reception circuit 26, achieves baseband transmission. Although not shown, the reception circuit 26 may include a waveform equalizing circuit which is generally referred to as an "equalizer circuit".

Referring again to FIG. 3, the configuration of the transmission-reception device 2 will be further described.

The conductor plane 23 is a conductor which has a predetermined potential and is provided on the surface of the substrate 22. In the first embodiment, the conductor plane 23 is formed as a ground conductor. The potential of the conductor plane 23 may be, for example, a fixed potential such as a power supply voltage. The conductor plane 23 is formed so as to surround the antenna element 21 at a distance from the outside of the ring shape of the antenna element 21. More specifically, as shown in FIG. 3, a rectangular shape of the conductor plane 23 surrounds the antenna element 21. As the conductor plane 23 surrounds the antenna element 21, the conductor plane 23 is able to function as a shield. This makes it possible to reduce the effect of the electromagnetic field of the antenna element 21 on other peripheral devices. To prevent other electronic components and the like from affecting the transmitting and receiving characteristics of the antenna element 21, it is preferable that other electronic components and the like not be disposed between the antenna element 21 and the conductor plane 23.

In particular, the interval between the antenna element 21 and the conductor plane 23 is set as follows. That is, the antenna element 21 and the conductor plane 23 are arranged in such a manner that a first interval is shorter than a second interval. The term "first interval" used herein refers to an interval (Du) between the conductor plane 23 and a first outer edge 214 of the antenna element 21 that is located on a side opposite to the side of the antenna element 21 where the discontinuous portion 210 is present. The term "second interval" used herein refers to an interval (Dl) between the conductor plane 23 and a second outer edge 215 of the antenna element 21 and an interval (Dr) between the conductor plane 23 and a third outer edge 216 of the antenna element 21 in a direction (horizontal direction shown in FIG. 3) which is substantially perpendicular to a direction (vertical direction shown in FIG. 3) connecting the discontinuous portion 210 and the first outer edge 214. Further, referring to FIG. 3, the first outer edge 214 is an upper outer edge of the antenna element 21 as shown in FIG. 3, and more specifically, an outer edge of the antenna element 21 that is located at a position opposite to the discontinuous portion 210 with respect to the center of the antenna. Furthermore, referring to FIG. 3, the second outer edge 215 and the third outer edge 216 are outer edges of the conductor forming the antenna element 21. The outer edges are each located at an outermost position of the conductor in the horizontal direction shown in FIG. 3. The interval between the second outer edge 215 and the conductor plane 23 is equal to the interval between the third outer edge 216 and the conductor plane 23 (Dl=Dr). An interval (Dd) between the conductor plane 23 and a fourth outer edge 217 of the antenna element 21 that is located on the side of the antenna element 21 where the discontinuous portion 210 is present is a predetermined interval. The interval (Dd) is, for example, an interval equal to or less than the interval (Du) between the first outer edge 214 and the conductor plane 23.

Considerations on the arrangement of the antenna element 21 and the conductor plane 23 by the present inventors will now be described. In the case of designing a transmission-side antenna, it is necessary that the antenna element 21 and the conductor plane 23 be located at a distance from each other so that a sufficient amplitude to receive signals by a reception-side antenna can be ensured. In order for the reception-side antenna to obtain a response waveform suitable for the reception of pulse signals, it is necessary to reduce a gain in a high frequency band that is unnecessary for the transmission between transmission and reception antennas. For this reason, there is a demand for designing antennas in consideration of a frequency response which varies in a complicated manner due to an electromagnetic field generated between antennas. An increase in man-hours needed for design is caused by such circumstances.

In this regard, the present inventors have found that a waveform distortion (ringing) due to a high-frequency peak can be suppressed by forming the antenna element 21 in the manner as described above and by arranging the antenna element 21 and the conductor plane 23 in such a manner that the interval Du is shorter than the intervals Dl and Dr.

Figure 7A:
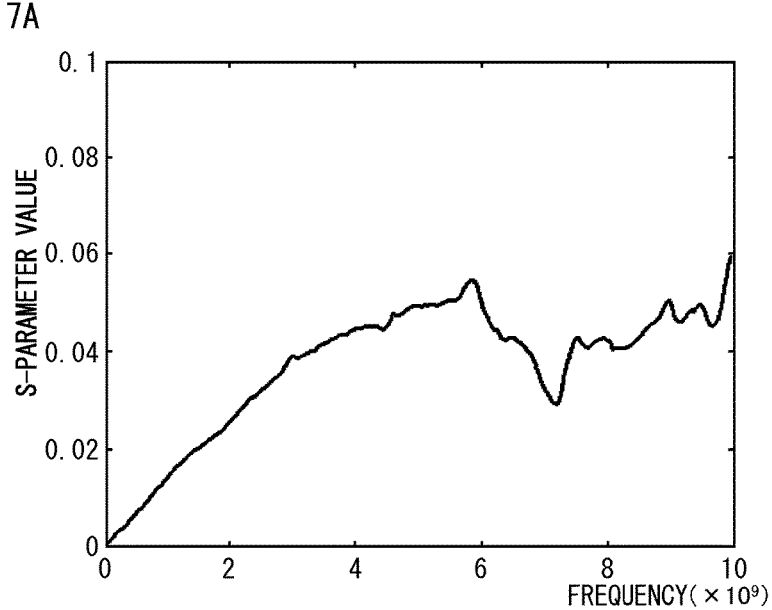
FIG. 7A is a graph showing transmission and reception results in the transmission-reception system according to the first embodiment, and also showing frequency characteristics of a transmission line between antennas.
Figure 7B:
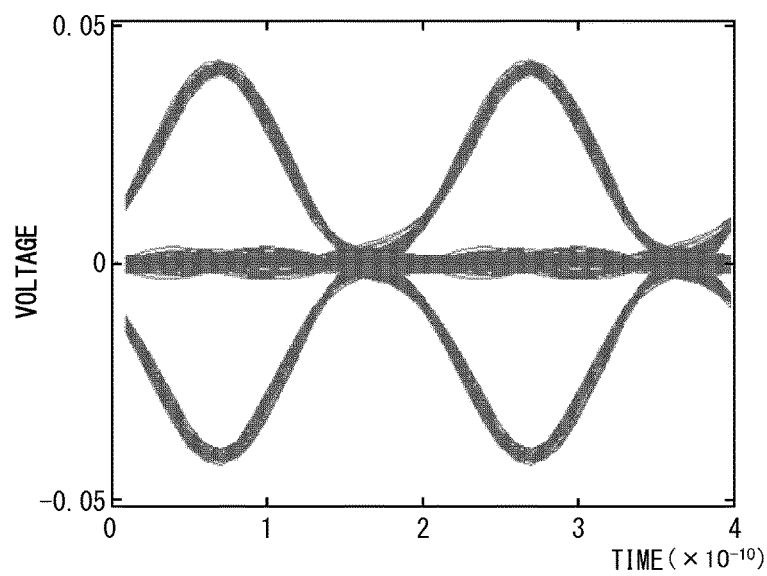
FIG. 7B is a graph showing transmission and reception results in the transmission-reception system according to the first embodiment, and also showing an eye pattern of a received waveform.
Figure 8A:
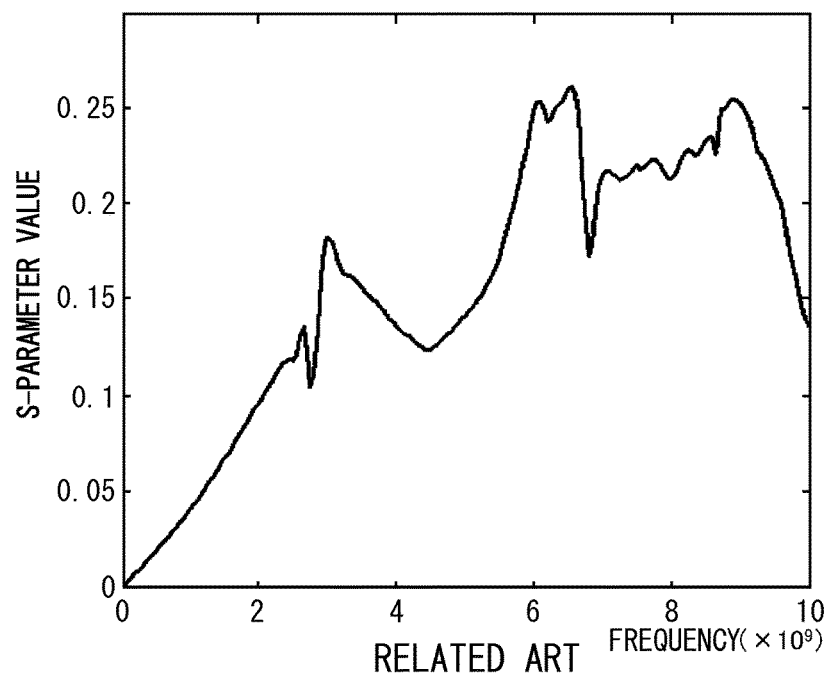
FIG. 8A is a graph showing transmission and reception results in a transmission-reception system according to a comparative example, and also showing frequency characteristics of a transmission line between antennas.
Figure 8B:
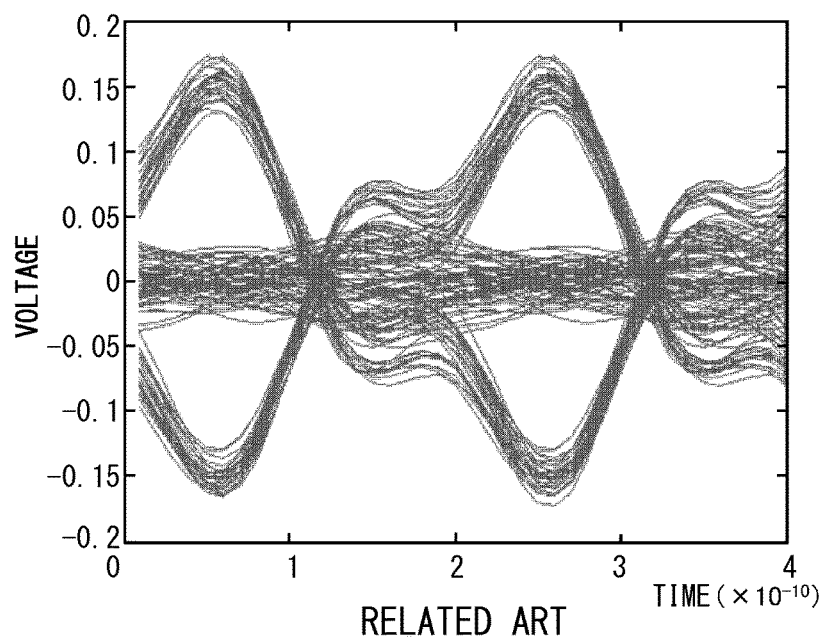
FIG. 8B is a graph showing transmission and reception results in the transmission-reception system according to the comparative example, and also showing an eye pattern of a received waveform.
Figure 9:
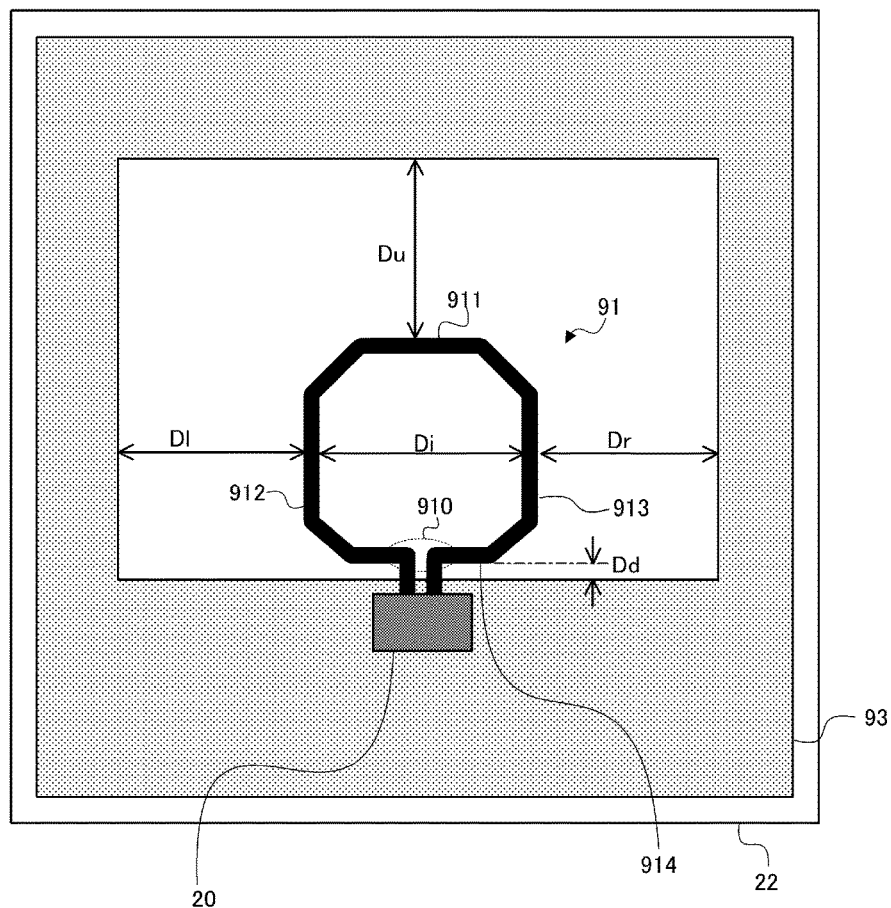
FIG. 9 is a plan view schematically showing the transmission-reception system according to the comparative example.
Figure 10A:
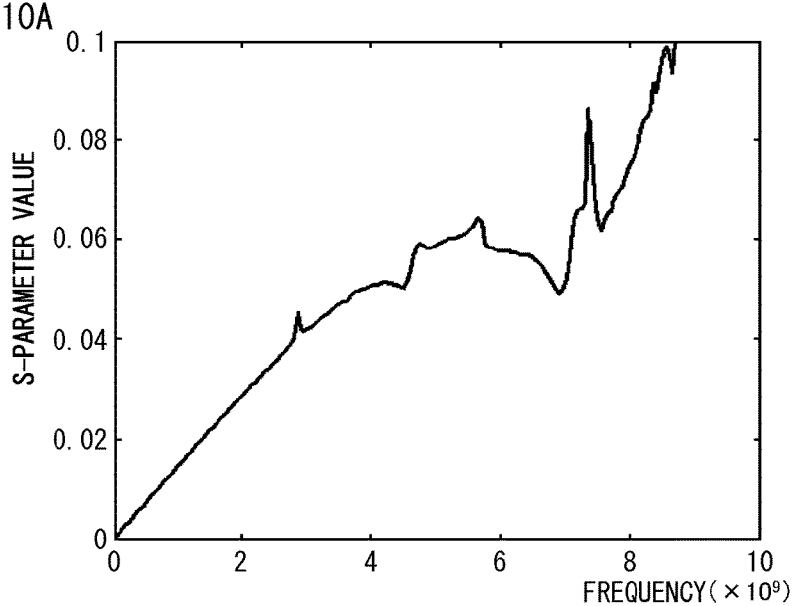
FIG. 10A is a graph showing transmission and reception results in the transmission-reception system according to the first embodiment, and also showing frequency characteristics of a transmission line between antennas when intervals Dl and Dr are each set to 7 mm.
Figure 10B:
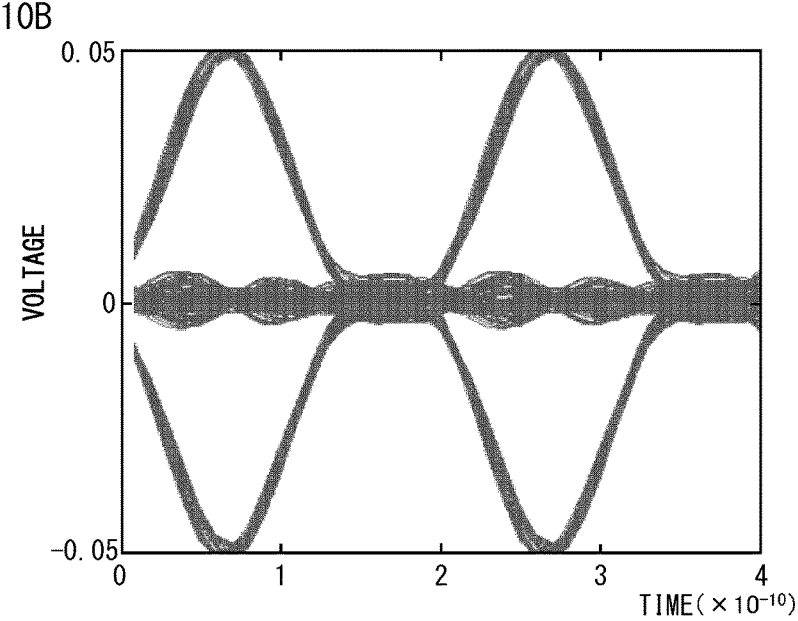
FIG. 10B is a graph showing transmission and reception results in the transmission-reception system according to the first embodiment, and also showing an eye pattern of a received waveform when the intervals Dl and Dr are each set to 7 mm.
Figure 11A:
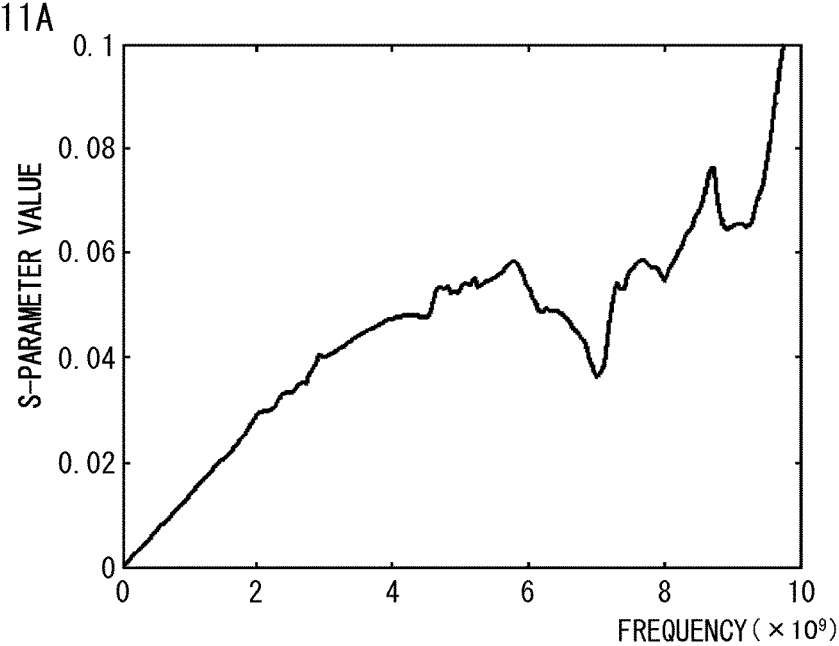
FIG. 11A is a graph showing transmission and reception results in the transmission-reception system according to the first embodiment, and also showing frequency characteristics of the transmission line between antennas when the intervals Dl and Dr are each set to 6 mm.
Figure 11B:
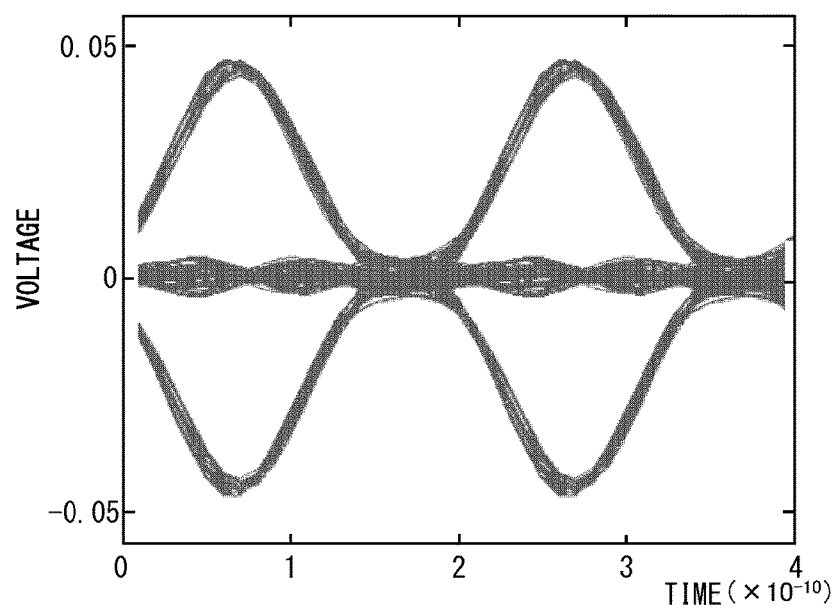
FIG. 11B is a graph showing transmission and reception results in the transmission-reception system according to the first embodiment, and also showing an eye pattern of a received waveform when the intervals Dl and Dr are each set to 6 mm.
Figure 12A:
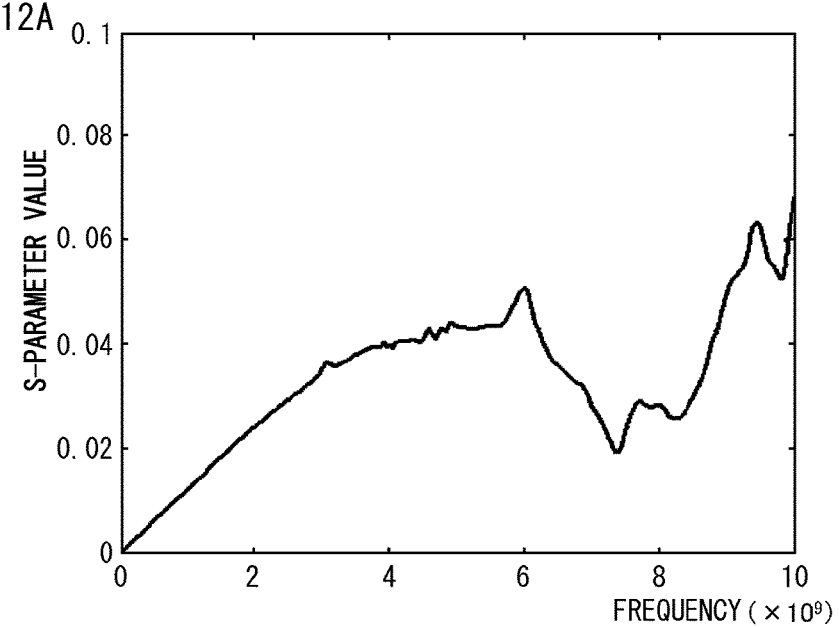
FIG. 12A is a graph showing transmission and reception results in the transmission-reception system according to the first embodiment, and also showing frequency characteristics of the transmission line between antennas when the intervals Dl and Dr are each set to 4 mm.
Figure 12B:
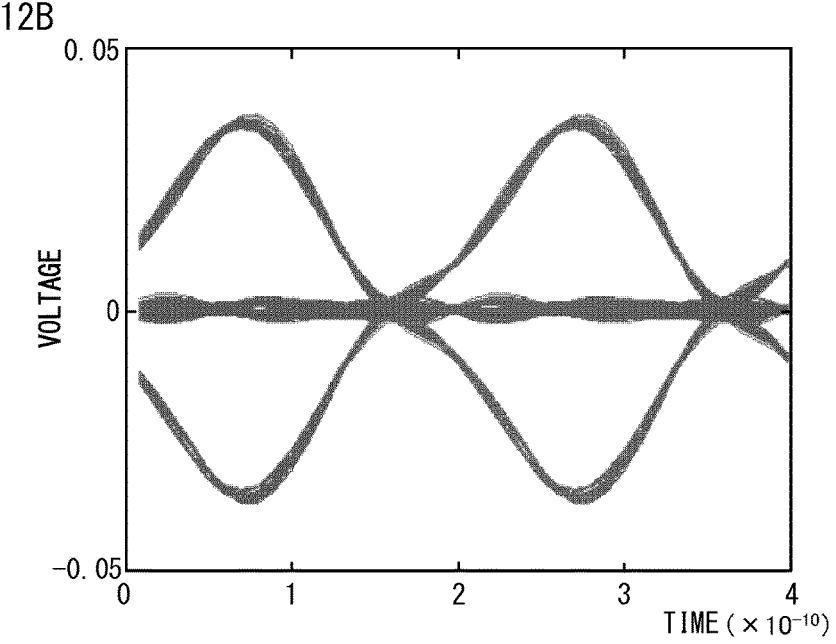
FIG. 12B is a graph showing transmission and reception results in the transmission-reception system according to the first embodiment, and also showing an eye pattern of a received waveform when the intervals Dl and Dr are each set to 4 mm.
Figure 13A:
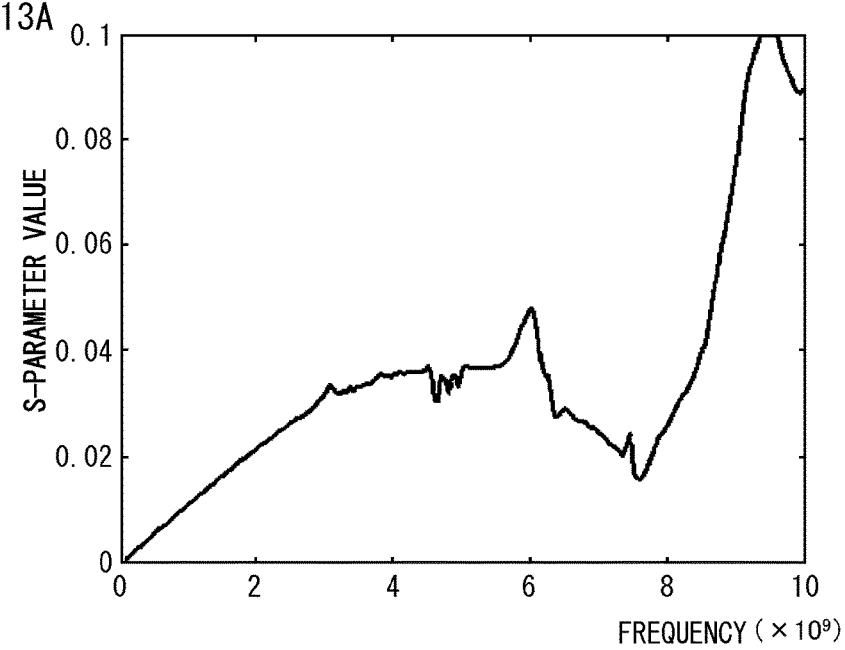
FIG. 13A is a graph showing transmission and reception results in the transmission-reception system according to the first embodiment, and also showing frequency characteristics of the transmission line between antennas when the intervals Dl and Dr are each set to 3 mm.
Figure 13B:
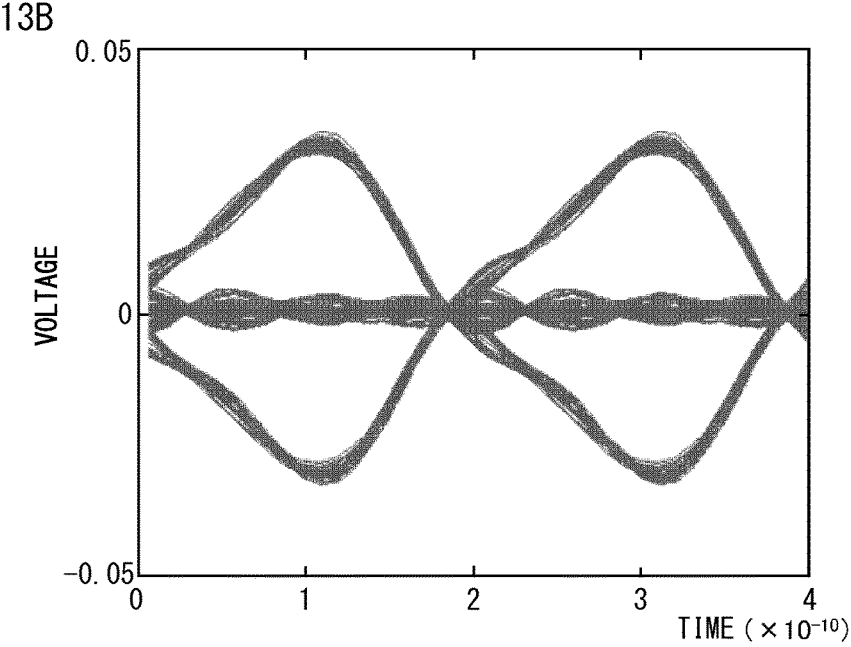
FIG. 13B is a graph showing transmission and reception results in the transmission-reception system according to the first embodiment, and also showing an eye pattern of a received waveform when the intervals Dl and Dr are each set to 3 mm.
Figure 14A:
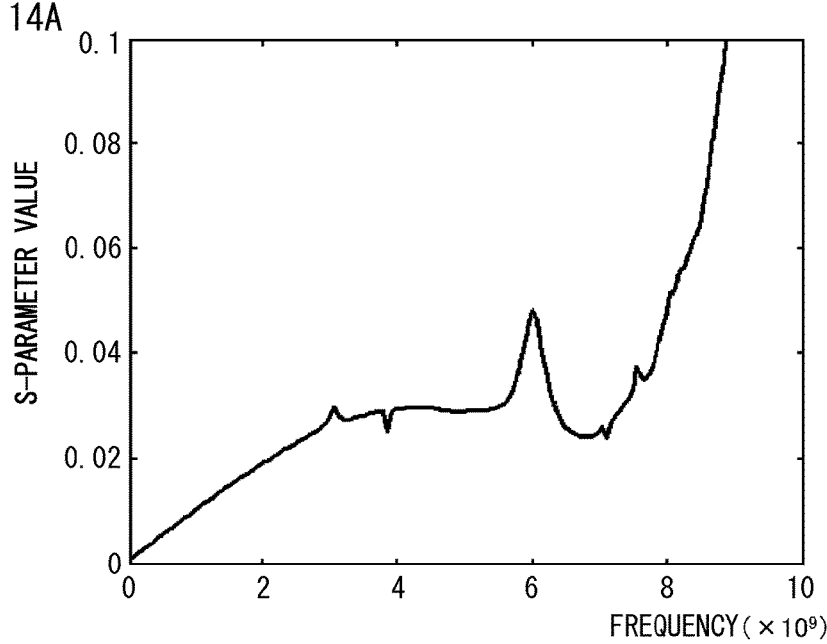
FIG. 14A is a graph showing transmission and reception results in the transmission-reception system according to the first embodiment, and also showing frequency characteristics of the transmission line between antennas when the intervals Dl and Dr are each set to 2 mm.
Figure 14B:
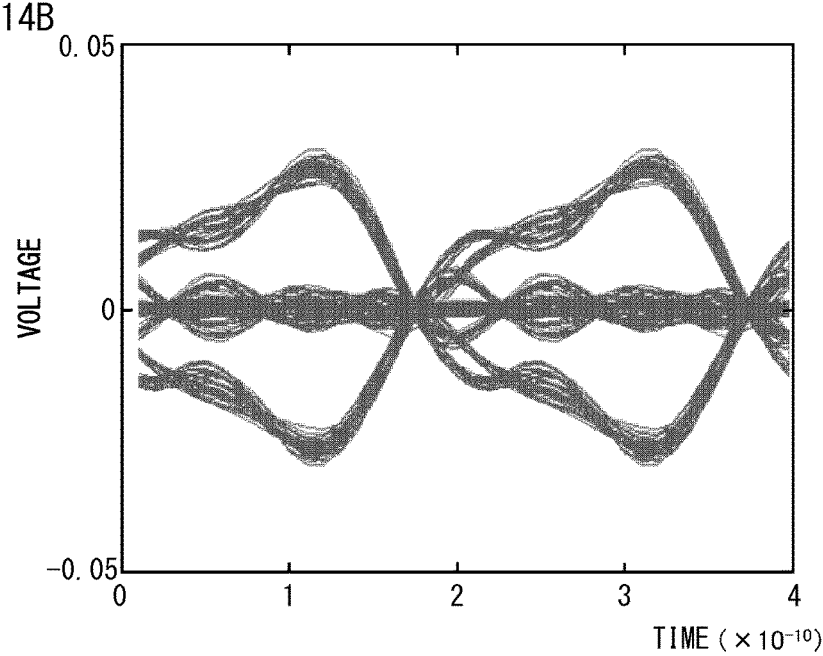
FIG. 14B is a graph showing transmission and reception results in the transmission-reception system according to the first embodiment, and also showing an eye pattern of a received waveform when the intervals Dl and Dr are each set to 2 mm.

FIGS. 7A and 7B are graphs showing transmission and reception results in the transmission-reception system 1 according to the first embodiment. FIG. 7A shows frequency characteristics of a transmission line between antennas, and FIG. 7B shows an eye pattern of a received waveform. In FIGS. 7A and 7B and subsequent figures, the horizontal axis of the graph showing frequency characteristics represents a frequency; the vertical axis of the graph represents an absolute value of an S-parameter value; the horizontal axis of the eye pattern represents time; and the vertical axis of the eye pattern represents voltage. On the other hand, FIGS. 8A and 8B are graphs showing transmission and reception results in a transmission-reception system according to a comparative example (note that the scale of the vertical axis of the graphs shown in FIGS. 8A and 8B is different from the scale of the vertical axis of the graphs shown in FIGS. 7A and 7B). As shown in FIG. 9, the transmission-reception system according to the comparative example has the same configuration as that of the transmission-reception system 1 according to the first embodiment, except that an antenna element 91 that transmits signals is composed of a loop antenna including no terminating element and the interval between the antenna element 91 and a conductor plane 93 is set as follows. That is, the antenna element 91 and the conductor plane 93 according to the comparative example are arranged in such a manner that a first interval is larger than a second interval. The term "first interval" used herein refers to the interval (Du) between the conductor plane 93 and a first outer edge 911 of the antenna element 91 that is located on a side opposite to the side of the antenna element 91 where a discontinuous portion 910 is present. The term "second interval" used herein refers to the interval (Dl) between the conductor plane 93 and a second outer edge 912 of the antenna element 91 and the interval (Dr) between the conductor plane 93 and a third outer edge 913 of the antenna element 91 in a direction (horizontal direction shown in FIG. 9) which is substantially perpendicular to a direction (vertical direction shown in FIG. 9) connecting the discontinuous portion 910 and the first outer edge 911.

Specifically, FIGS. 7A and 7B show the results when the following conditions for the antenna element 21 and the conductor plane 23 according to the first embodiment are adopted.

Conditions for an Example (FIGS. 7A and 7B) of the First Embodiment

Interval Du: 1 mm
Intervals Dl and Dr: 5 mm
Interval Dd: 0.5 mm
Inner diameter Di of the antenna element 21: 5 mm
Thickness of the conductor forming the antenna element 21: 1 mm Specifically, FIGS. 8A and 8B show the results when the following conditions for the antenna element 91 and the conductor plane 93 according to the comparative example are adopted.

Conditions for the Comparative Example (FIGS. 8A and 8B)

Interval Du: 5 mm
Intervals Dl and Dr: 5 mm
Interval Dd: 0.5 mm
Inner diameter Di of the antenna element 91: 5 mm
Thickness of the conductor forming the antenna element 91: 1 mm As seen from FIGS. 7A and 7B and FIGS. 8A and 8B, the antenna element is terminated at the virtual ground point side of the antenna element and the interval Du is set to be shorter than the intervals Dl and Dr, with the result that the received waveform of the reception-side antenna is improved. It turns out that this configuration prevents the electromagnetic field generated in the antenna element from being distributed unevenly. For example, in the antenna configuration according to the comparative example, an electromagnetic field in a plane, which passes through an intermediate point between a pair of transmission and reception antennas and is parallel to planes formed by the antenna elements, is distributed unevenly on the inside or outside of the ring shape of the antenna element 91 that is projected onto the plane. On the other hand, the electromagnetic field distribution in the antenna configuration according to the first embodiment has a peak electromagnetic field strength on the inside of the ring shape of the antenna element 21 that is projected onto the plane. Thus, as is obvious from a comparison between FIG. 7A and FIG. 8A, it is considered that the high-frequency gain is reduced. A reduction in the high-frequency gain can suppress the distortion of the received waveform due to ringing of high-frequency components. Accordingly, a response waveform suitable for the reception of signals can be obtained by the reception-side antenna. Therefore, according to the transmission-reception device of the first embodiment, a waveform suitable for the reception of signals can be obtained while reducing the man-hours needed for design, unlike in a case where antennas are designed without imposing the condition that the interval Du is set to be shorter than the intervals Dl and Dr. In other words, heretofore it has been necessary to design antennas by performing a two-dimensional adjustment of the interval Du and the intervals Dl and Dr, while according to the first embodiment, the intervals can be adjusted by fixing the interval Du and performing a one-dimensional adjustment to vary the intervals Dl and Dr, under the condition that the interval Du is set to be shorter than the intervals Dl and Dr.

While the first embodiment has been described above, it is preferable that each of the intervals Dl and Dr be equal to a length corresponding to an inner diameter of each antenna element. FIGS. 10A to 14B show the results when the intervals Dl and Dr between the antenna element 21 and the conductor plane 23 according to the first embodiment are each set to 7 mm, 6 mm, 4 mm, 3 mm, and 2 mm. FIGS. 7A and 7B show the results when the intervals Dl and Dr are each set to 5 mm, which is the same length as the inner diameter of the antenna element 21. In FIGS. 10A to 14B, conditions other than the intervals Dl and Dr are the same as the conditions shown in FIGS. 7A and 7B described above.

As shown in FIGS. 7A and 7B and FIG. 10A to 14B, when the intervals Dl and Dr are set to be smaller than the inner diameter Di of the antenna element 21, an unwanted high-frequency response increases, which results in an increase in ringing. When the intervals Dl and Dr are set to be larger than the inner diameter Di of the antenna element 21, an energy loss due to the surrounding conductor plane 23 decreases, which results in an increase in gain between antenna elements. However, an increase in the intervals Dl and Dr leads to an increase in the mounting area. When the conductor plane 23 is not provided around the antenna element 21, the gain increases as compared with the case where the conductor plane 23 is provided, but the radiation electric field around the antenna element 21 increases and it is difficult to shield the antenna element 21 from outside noise. Accordingly, it is preferable to provide the conductor plane 23. In view of the above, it is preferable that the intervals Dl and Dr be equal to the length corresponding to the inner diameter of each antenna element.

Second Embodiment

Next, a second embodiment will be described. A transmission-reception device 3 according to the second embodiment differs from the transmission-reception device of the first embodiment in that an antenna element 31 is used instead of the antenna element 21. A transmission-reception system according the second embodiment has the same configuration as that of the first embodiment, except that the antenna element 21 is replaced by the antenna element 31 described below. Accordingly, the description thereof is omitted. The antenna element 31 will be described below.

Figure 15:
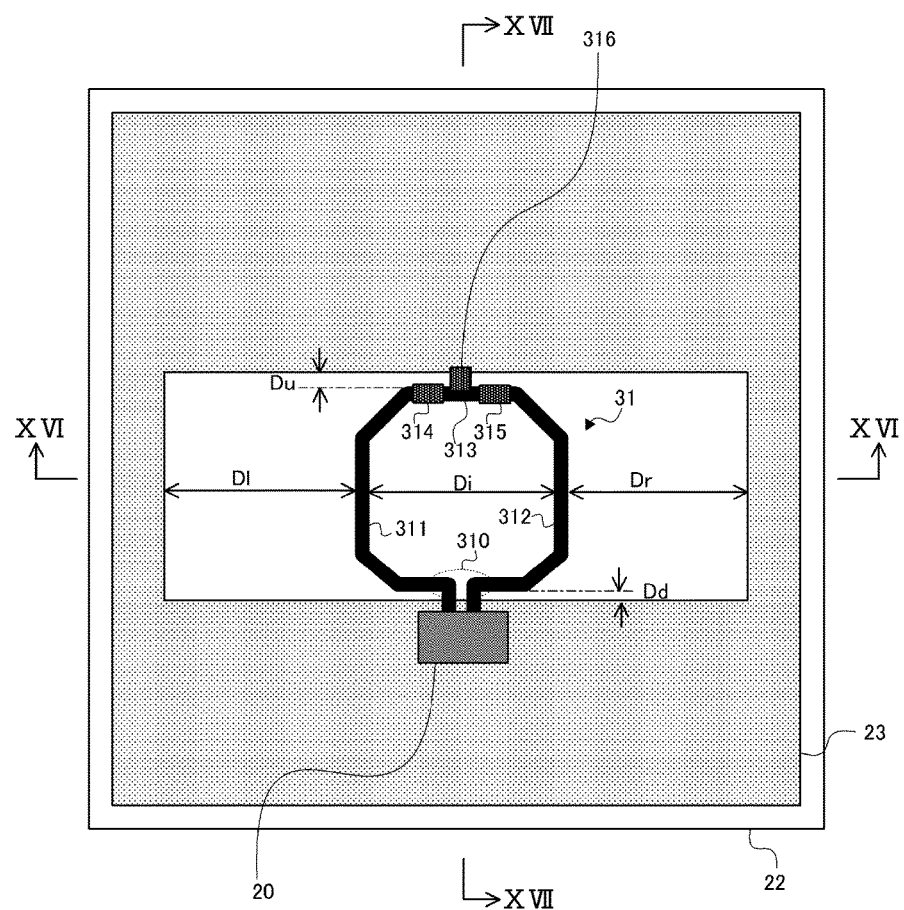
FIG. 15 is a plan view schematically showing a transmission-reception device according to a second embodiment.
Figure 16:
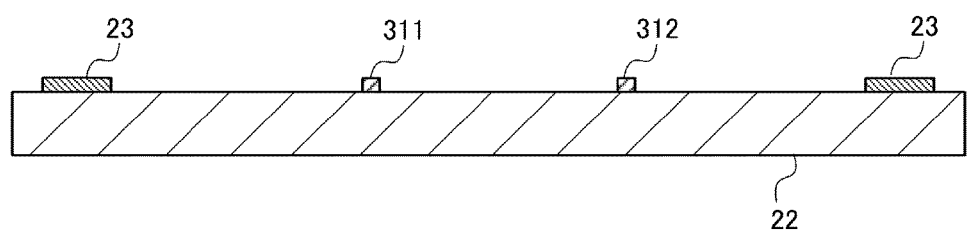
FIG. 16 is a sectional view taken along a line XVI-XVI of FIG. 15.
Figure 17:
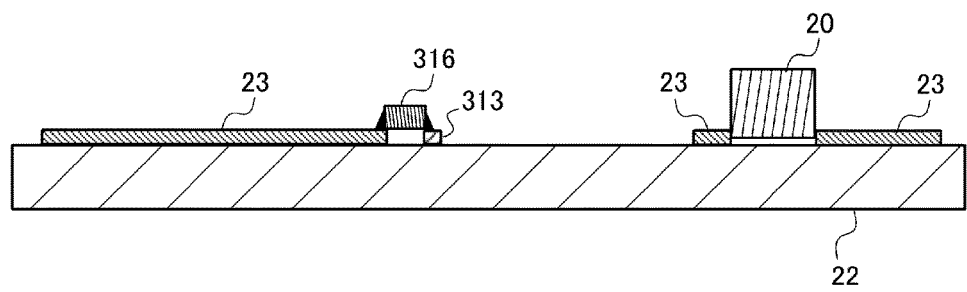
FIG. 17 is a sectional view taken along a line XVII-XVII of FIG. 15.

FIG. 15 is a plan view schematically showing the transmission-reception device 3 according to the second embodiment. FIG. 16 is a sectional view taken along a line XVI-XVI of FIG. 15. FIG. 17 is a sectional view taken along a line XVII-XVII of FIG. 15.

As shown in FIGS. 15 to 17, the antenna element 31 is an antenna composed of a conductor which has a ring shape and partially includes a discontinuous portion 310. The antenna element 31 is formed on the substrate 22. For example, as shown in FIG. 15, the antenna element 31 is formed symmetrically with respect to a line. In the antenna element 31, both ends of the conductor forming the discontinuous portion 310 are bent toward the outside of the ring shape. Both of the ends of the conductor are connected to the transmission-reception circuit 20 provided on the substrate 22. The transmission-reception circuit 20 outputs a differential signal to the antenna element 31.

In this case, the antenna element 31 is terminated at a virtual ground point side of the antenna element 31 by a terminating element, in the same manner as the antenna element 21 described above. Note that a first terminating element 314 and a second terminating element 315, which are connected in series, are used as terminating elements. An intermediate node between the first terminating element 314 and the second terminating element 315 is terminated with respect to the conductor plane 23 by a third terminating element 316. That is, the second embodiment differs from the first embodiment in that common-mode termination is employed.

More specifically, the conductor forming the antenna element 31 includes a first antenna portion 311, a second antenna portion 312, and a third antenna portion 313, which are connected as follows.

One end of the first antenna portion 311 is electrically connected to the transmission-reception circuit 20, and the other end of the first antenna portion 311 is electrically connected to the first terminating element 314. One end of the second antenna portion 312 is electrically connected to the transmission-reception circuit 20, and the other end of the second antenna portion 312 is electrically connected to the second terminating element 315. The third antenna portion 313 is disposed at a node corresponding to a virtual ground point when the antenna element 31 is set as a differential line, and both of the ends of the third antenna portion 313 are electrically connected to the first terminating element 314 and the second terminating element 315, respectively. In the third antenna portion 313, a portion corresponding to the intermediate node between the first terminating element 314 and the second terminating element 315 is electrically connected to the third terminating element 316. In other words, the antenna element 31 has a configuration in which the first antenna portion 311, the first terminating element 314, the third antenna portion 313, the second terminating element 315, and the second antenna portion 312 are continuously formed in a ring shape. The third terminating element 316 is electrically connected to each of the third antenna portion 313 and the conductor plane 23. Specifically, the third terminating element 316 is connected to the nearest conductor plane 23. More specifically, the third terminating element 316 is connected to, for example, a portion of the inner edge of the conductor plane 23 that is located on an axis passing through the center of the antenna element 31 and the discontinuous portion 310. The conductor plane 23 is located on the outside of the third antenna portion 313.

In the second embodiment, the first terminating element 314 and the second terminating element 315 are resistive elements, and the third terminating element 316 is a capacitive element. A resistive element may be used as the third terminating element 316. However, to suppress power consumption due to a direct current, a capacitive element is preferably used as the third terminating element 316. The antenna element 31 having the configuration as described above is produced in such a manner that, for example, a copper wire that constitutes the first antenna portion 311, the second antenna portion 312, and the third antenna portion 313 is formed on the substrate 22, and then the first terminating element 314, the second terminating element 315, and the third terminating element 316 are mounted on the substrate 22.

The interval between the antenna element 31 and the conductor plane 23 is the same as the interval between the antenna element 21 and the conductor plane 23 according to the first embodiment. That is, the antenna element 31 and the conductor plane 23 are arranged in such a manner that a first interval is shorter than a second interval. The term "first interval" used herein refers to the interval (Du) between the conductor plane 23 and the third antenna portion 313 which is a first outer edge of the antenna element 31 that is located on a side opposite to the side of the antenna element 31 where the discontinuous portion 310 is present. The term "second interval" used herein refers to the interval (Dl) between the conductor plane 23 and the first antenna portion 311, which is a second outer edge of the antenna element 31, and the interval (Dr) between the conductor plane 23 and the second antenna portion 312, which is a third outer edge of the antenna element 31, in a direction (horizontal direction shown in FIG. 15) substantially perpendicular to a direction (vertical direction shown in FIG. 15) connecting the discontinuous portion 310 and the first outer edge (third antenna portion 313). In this case, the interval Du corresponds to, for example, the size of the third terminating element 316. When an electronic component generally called a chip capacitor is adopted as the third terminating element 316, the interval Du is about 0.5 mm to 2 mm. The interval (Dd) between the conductor plane 23 and the outer edge of the antenna element 31 that is located on the side of the antenna element 31 where the discontinuous portion 310 is present is a predetermined interval. The interval Du is, for example, an interval equal to or less than the interval (Du).

Figure 18:
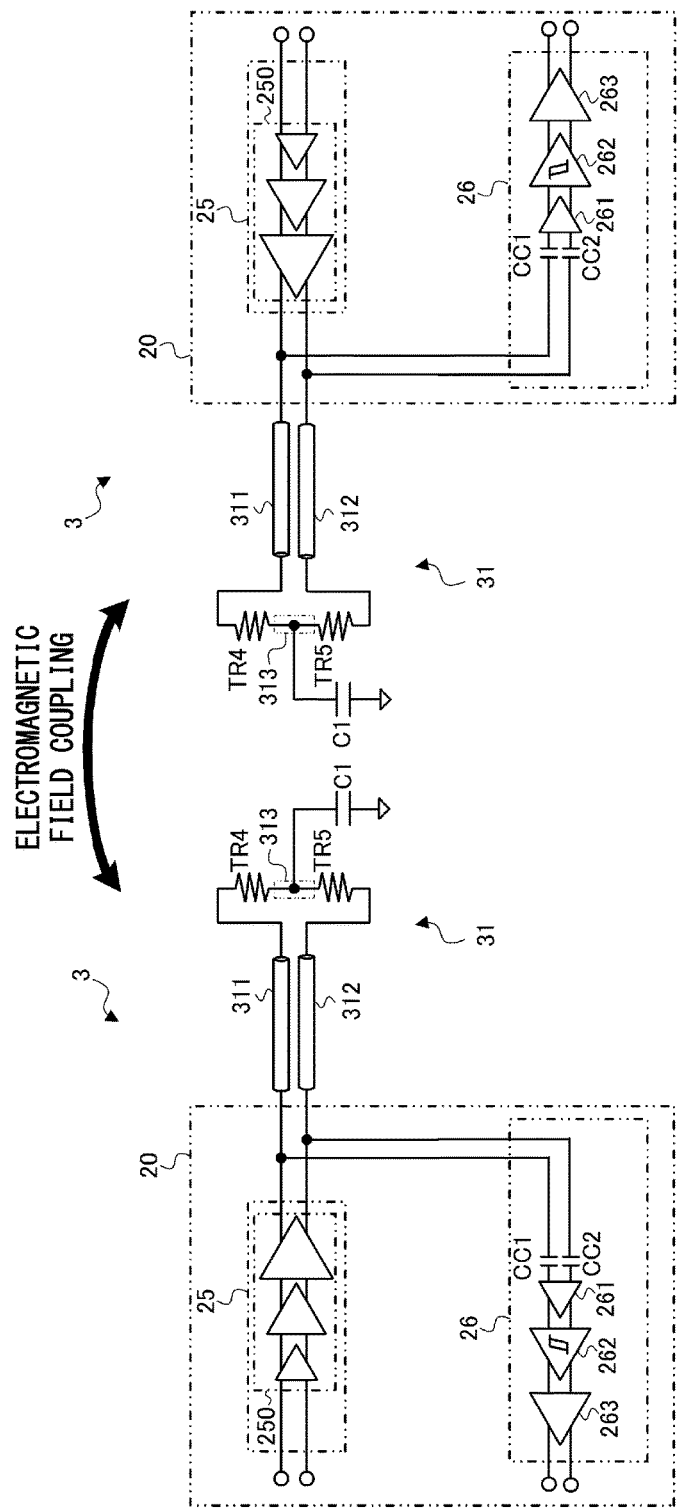
FIG. 18 is a circuit diagram showing a circuit configuration example of the transmission-reception device included in a transmission-reception system according to the second embodiment.

Next, the transmission-reception devices 3 using the antenna element 31 will be described. FIG. 18 is a circuit diagram showing a circuit configuration example of two transmission-reception devices 3 included in the transmission-reception system according to the second embodiment. In each transmission-reception device 3, both ends of the antenna element 31 are connected to a pair of differential signal output terminals of the transmission circuit 25 and a pair of differential signal input terminals of the reception circuit 26. With this configuration, the transmission circuit 25 outputs differential signals to both of the ends of the antenna element 31, that is, an end of the first antenna portion 311 and an end of the second antenna portion 312. The reception circuit 26 receives the differential signals received by the antenna element 31, and converts the pulse signals into signals of a predetermined line coding system (for example, NRZ coding).

In the example shown in FIG. 18, as described above, the antenna element 31 includes the first antenna portion 311, the second antenna portion 312, the third antenna portion 313, a resistor TR4 serving as the first terminating element 314, a resistor TR5 serving as the second terminating element 315 and having the same resistance value as that of the resistor TR4, and a capacitor C1 serving as the third terminating element 316. In this case, the line between the first antenna portion 311 and the second antenna portion 312 is terminated by the resistors TR4 and TR5. An intermediate node between the resistors TR4 and TR5 is ground-terminated by the capacitor C1.

Since the transmission circuit 25 is composed of a differential pair, it is ideal that the transmission circuit 25 can output perfect differential signals to the antenna element 31. However, in practice, an in-phase signal, which is noise, and differential signals are output at the same time, for example, due to a slight imbalance between the differential pair. This is generally referred to as common-mode noise, which causes EMI (Electro-Magnetic Interference). In the second embodiment, the virtual ground point of the antenna element 31 driven by the differential signal is terminated by the first terminating element 314 and the second terminating element 315. An intermediate node between these two terminating elements and the conductor plane 23 are ground-terminated by the third terminating element 316. This configuration can reduce the common-mode noise, leading to a reduction in EMI noise. When a capacitive element is used as the third terminating element 316, the third antenna portion 313 and the conductor plane 23 are common-mode terminated by the capacitive element. Thus, since the third antenna portion 313 and the conductor plane 23 can be terminated without causing a direct current to flow from the transmission circuit 25 to the conductor plane 23, the power consumption can be suppressed. In this manner, according to the second embodiment, a waveform suitable for the reception of signals can be transmitted and thus the EMI noise can be reduced.

Figure 19:
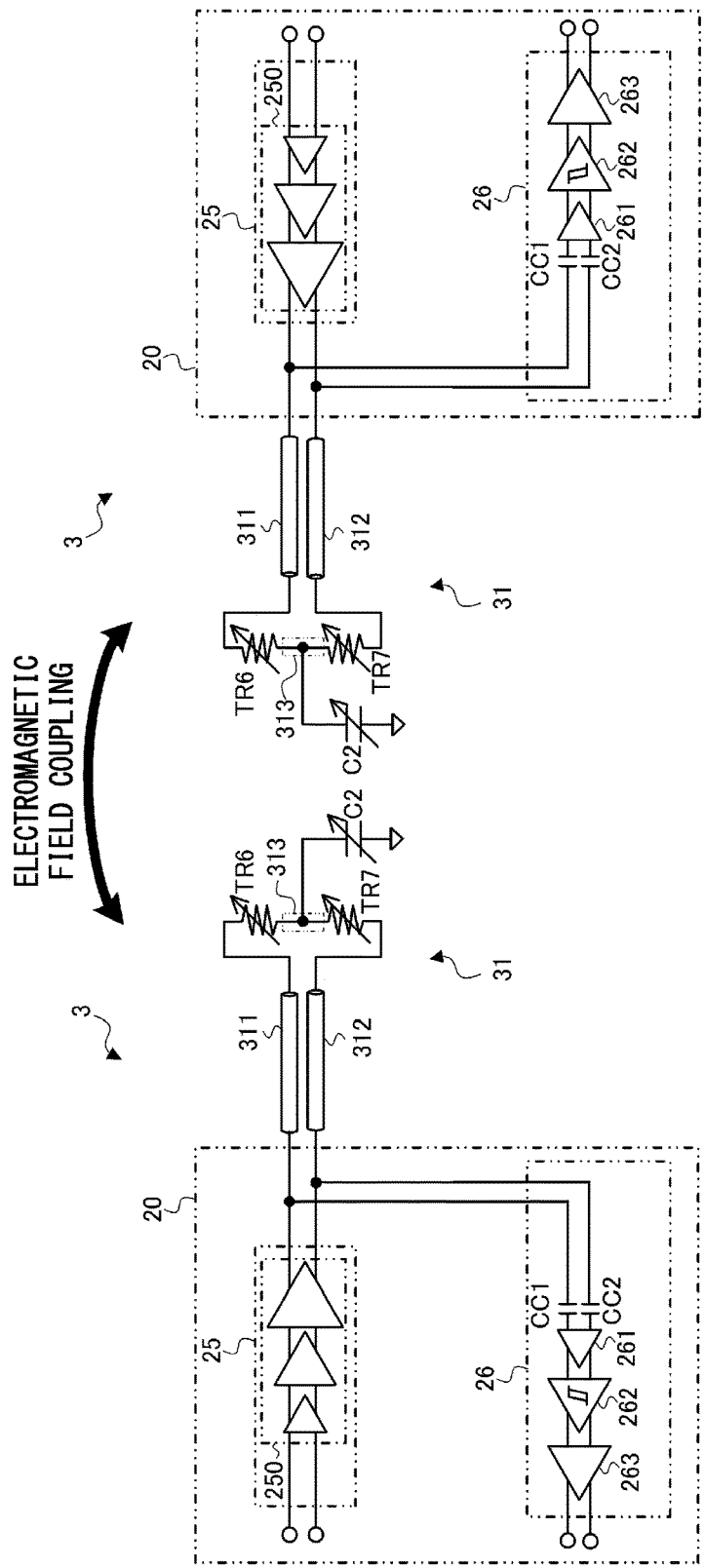
FIG. 19 is a circuit diagram showing a circuit configuration example in which a variable resistive element and a variable capacitive element are used in the transmission-reception device included in the transmission-reception system according to the second embodiment.

While the second embodiment has been described above, as shown in FIG. 19, a resistor TR6 and a resistor TR7, which are variable resistive elements capable of changing resistance values, may be used instead of the resistor TR4 and the resistor TR5, and a capacitor C2, which is a variable capacitive element capable of changing a capacitance, may be used instead of the capacitor C1.

According to the non-contact connector technique, when a large antenna element (an antenna element with a large inner diameter) and a small antenna element (an antenna element with a small inner diameter) are compared with each other, the small antenna element is capable of transmitting signals at a high speed, but has a short transmission distance, while in the large antenna element, the allowable data rate is limited, but the transmission distance can be increased. As the transmission distance of an antenna element increases, i.e., as the antenna element increases in size, the resonance frequency of the antenna element decreases as compared with the resonance frequency of a small antenna element. Therefore, in the case of using a large antenna element, if a signal rise time is extremely short (i.e., if the antenna element has a high gain in a high-frequency band that is unnecessary for signal transmission in a frequency domain), ringing may occur in the received signals due to unwanted high-frequency response components of the antenna element. In the configuration shown in FIG. 19, since the resistors and capacitors which are added to the antenna elements are variable, resonance points can be adjusted. Consequently, ringing can be suppressed and thus a waveform suitable for the transmission and reception of baseband signals can be obtained.

Third Embodiment

Figure 20:
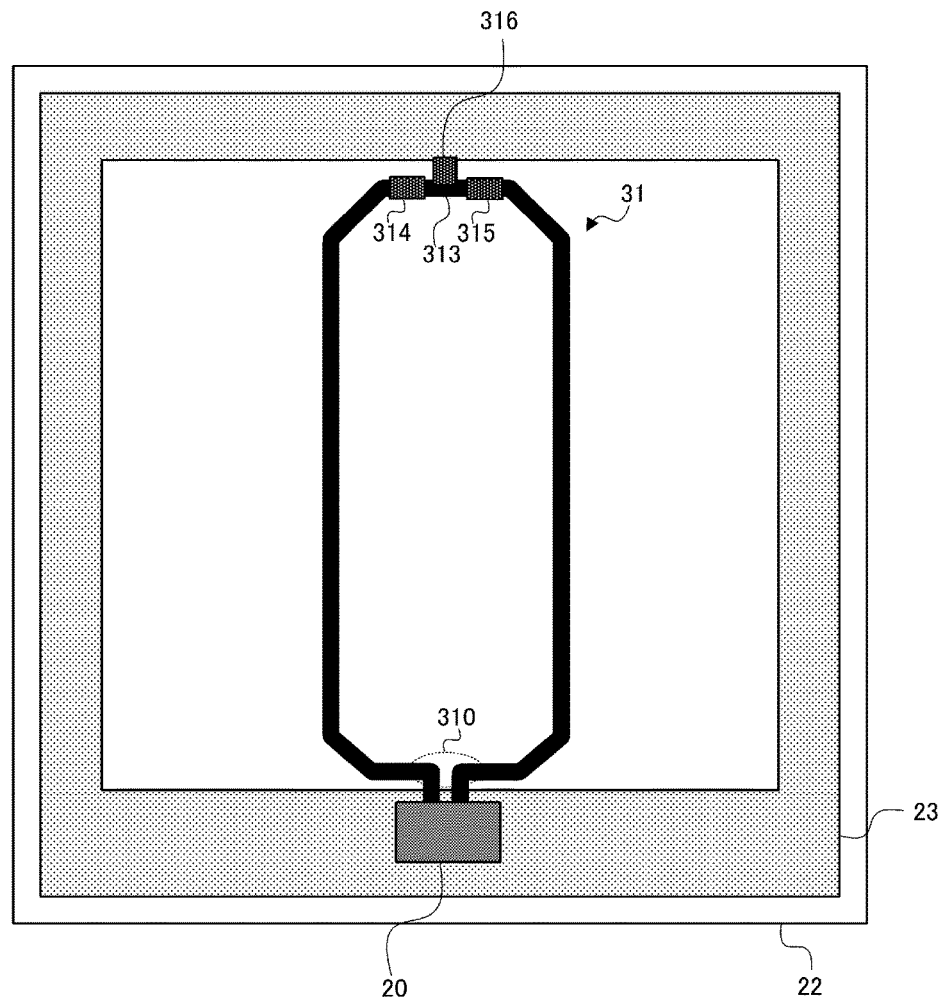
FIG. 20 is a plan view schematically showing an antenna element according to a third embodiment.

Next, a third embodiment will be described. The aspect ratios of the antenna element 21 and the antenna element 31, which are described in the above embodiments, need not necessarily be the same. For example, as shown in FIG. 20, the antenna element 31 may be configured in such a manner that the antenna element 31 extends in a direction (vertical direction shown in FIG. 20) connecting the discontinuous portion 310 and the third antenna portion 313. While FIG. 20 illustrates the configuration of the antenna element 31, the antenna element 21 may also be configured to extend in the same manner as the antenna element 31.

In the transmission-reception system, one of the transmission-side antenna element and the reception-side antenna element may be configured to extend in the manner as shown in FIG. 20. Specifically, the transmission-side antenna element and the reception-side antenna element may be configured in such a manner that the total length of one of the antenna elements is longer than the total length of the other antenna element. The term "total length" used herein refers not to the length of the ring-shaped antenna element in the circumferential direction thereof, but to the longitudinal length or the lateral length of the ring-shaped antenna element.

Figure 21:
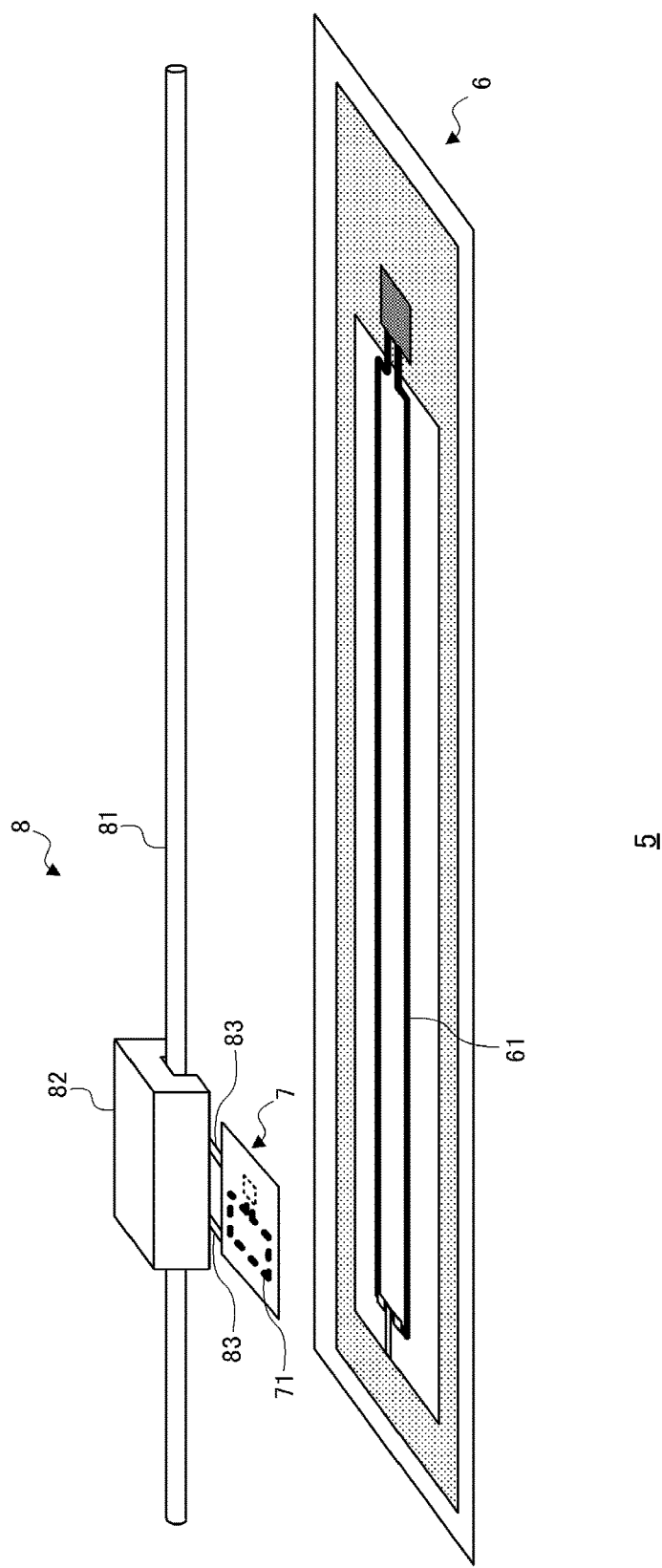
FIG. 21 is a perspective view schematically showing a configuration of a transmission-reception system according to the third embodiment.

For example, the transmission-reception system may have a configuration as shown in FIG. 21. FIG. 21 is a perspective view schematically showing a configuration of a transmission-reception system 5 according to the third embodiment. The transmission-reception system 5 includes a transmission-reception device 6, a transmission-reception device 7, and a movable mechanism 8.

The transmission-reception device 6 and the transmission-reception device 7 have the same configuration as that of the transmission-reception device 2 or the transmission-reception device 3 described above. Note that the total length of an antenna element 61 included in the transmission-reception device 6 is longer than the total length of an antenna elements 71 included in the transmission-reception device 7. The transmission-reception devices 6 and 7 are disposed so as to be opposed to each other, and transmit signals by electromagnetic field coupling between the antenna element 61 of the transmission-reception device 6 and the antenna element 71 of the transmission-reception device 7. The antenna element 61 and the antenna element 71 are disposed at a predetermined interval so as to overlap each other.

The movable mechanism 8 moves the transmission-reception device 7, thereby causing the antenna element 71 to move above the antenna element 61 of the transmission-reception device 6. The movable mechanism 8 includes a guide rail 81, a movable unit 82, and a coupler 83. The guide rail 81 is disposed so as to be parallel to a direction in which the antenna element 61 extends. The movable unit 82 includes, for example, a motor (not shown), and moves along the guide rail 81. The coupler 83 couples the movable unit 82 to the transmission-reception device 7. With this configuration, the transmission-reception device 7 moves above the transmission-reception device 6 in accordance with the movement of the movable unit 82.

According to this configuration, since one of the antenna elements is longer than the other antenna element, the other antenna element can transmit signals by electromagnetic field coupling at any position above the one antenna element, which leads to an improvement in the degree of freedom of design. The provision of the movable mechanism 8 enables the arrangement of the transmission-reception devices to be variable. Accordingly, for example, when a printer head of an inkjet printer moves along a guide rail, data can be transmitted to and received from the printer head.

Figure 22:
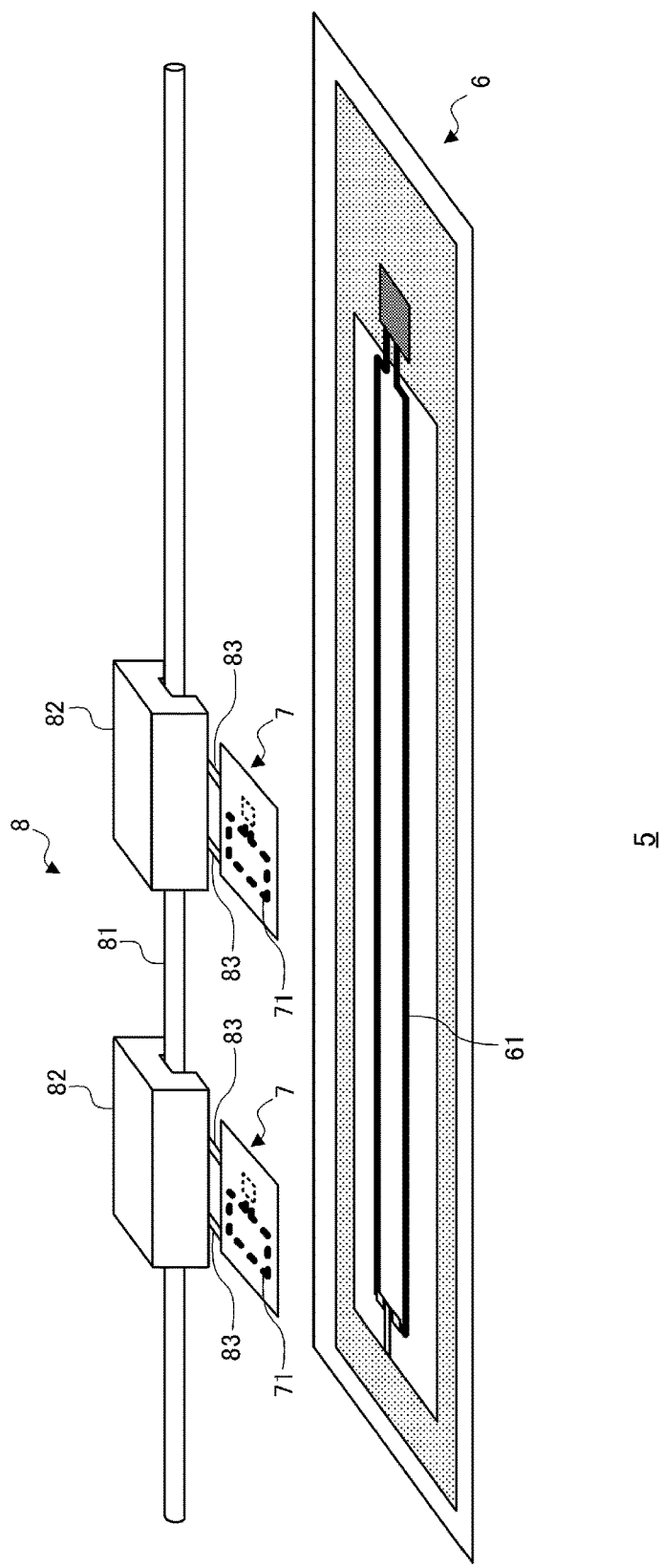
FIG. 22 is a perspective view schematically showing a configuration in which point-to-multipoint transmission is performed in the transmission-reception system according to the third embodiment.

While FIG. 21 shows a configuration example in which one transmission-reception device 7 is provided, a plurality of transmission-reception devices 7 may be provided as shown in FIG. 22. In this case, the total length of the antenna element 61 is longer than the sum of the total lengths of the plurality of antenna elements 71. The plurality of transmission-reception devices 7 may be respectively coupled to different movable units 82 as shown in FIG. 22, but instead the plurality of transmission-reception devices 7 may be coupled to a single movable unit 82. Thus, point-to-multipoint transmission can be achieved by providing the plurality of transmission-reception devices 7.

While the invention made by the present inventors has been described in detail above with reference to embodiments, the present invention is not limited to the above embodiments. The present invention can be modified in various ways without departing from the scope of the invention.

Figure 23:
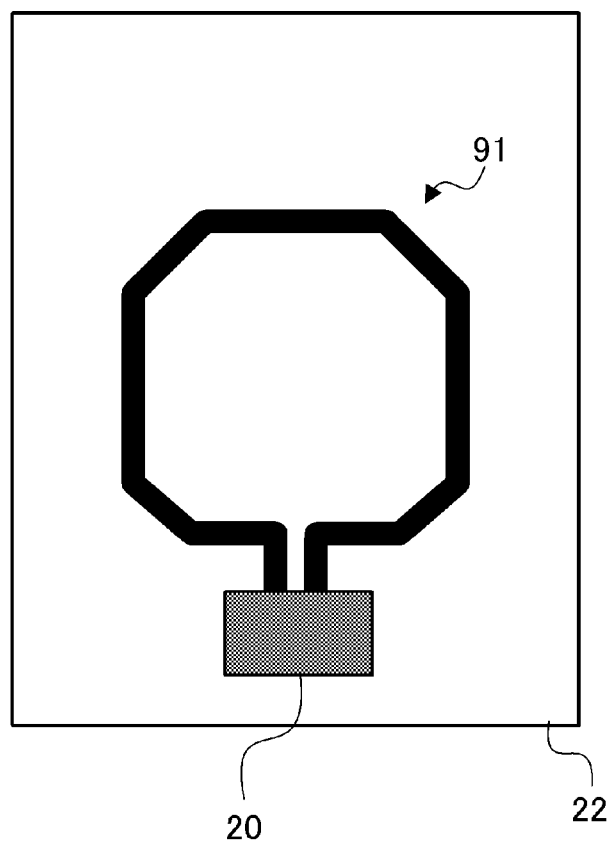
FIG. 23 is a plan view schematically showing an example of a receiving antenna element.

For example, the transmission-reception systems illustrated in the embodiments have a configuration in which two transmission-reception devices including a transmission function and a reception function are provided. Alternatively, the transmission-reception systems may have a configuration in which data is received from the antenna element of the transmission device and data is received by the antenna element of the reception device. In other words, it is not necessary that both of the transmission circuit and the reception circuit be connected to one of the antenna elements. Only the transmission circuit may be connected to one of the antenna elements. Further, it is not necessary that both of the transmission circuit and the reception circuit be connected to the other one of the antenna elements. Only the reception circuit may be connected to the other antenna element. The above-described configuration of the antenna elements may be applied to the antenna element connected to the transmission circuit, and the antenna element connected to the reception circuit may be composed of a loop antenna including no terminating element as shown in FIG. 9. The antenna element connected to the reception circuit may have a configuration in which no conductor plane is provided as shown in FIG. 23. The omission of the conductor plane leads to downsizing of the reception device.

The conductor plane 23 is not necessarily formed on the same surface as the surface on which the antenna elements are arranged. The conductor plane 23 may be formed on a surface opposite to the substrate 22. When a multilayer substrate is used as the substrate 22, the conductor plane 23 may be disposed in a layer within the substrate 22.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
   an antenna element which has a ring shape and partially includes a discontinuous portion;
   a conductor which has a predetermined potential and surrounds the antenna element on an outside of the ring shape; and a transmission circuit that outputs a differential signal to both ends of the antenna element forming the discontinuous portion, wherein the antenna element is terminated at a virtual ground point side of the antenna element by a terminating element, and a first interval, in a first direction between the conductor and a first outer edge of the antenna element located on a side of the antenna element opposing the discontinuous portion, is shorter than both a second interval, between the conductor and a second outer edge of the antenna element in a second direction substantially perpendicular to the first direction, and a third interval, between the conductor and a third outer edge of the antenna element in the second direction and opposing the second outer edge.

2. The semiconductor device according to claim 1, wherein the antenna element is terminated at the virtual ground point side of the antenna element by a first terminating element and a second terminating element, and an intermediate node between the first terminating element and the second terminating element is terminated with respect to the conductor by a third terminating element.

3. The semiconductor device according to claim 1, wherein an interval between the second outer edge and the conductor is a length corresponding to an inner diameter of the antenna element.

4. The semiconductor device according to claim 2, wherein the first terminating element and the second terminating element are resistive elements, and the third terminating element is a capacitive element.

5. The semiconductor device according to claim 4, wherein the first terminating element and the second terminating element are variable resistive elements, and the third terminating element is a variable capacitive element.

6. The semiconductor device according to claim 1, further comprising a reception circuit that receives the differential signal from the both of the ends of the antenna element.

7. The semiconductor device according to claim 1, wherein the second interval is substantially equal to the third interval.

8. The semiconductor device according to claim 1, wherein a fourth interval, in the first direction between the conductor and a fourth outer edge of the antenna element opposing the first outer edge, is equal to or less than the first interval.

* * * * *